United States Patent [19]

Andre et al.

[11] Patent Number: 4,850,767

[45] Date of Patent: Jul. 25, 1989

[54] WHEEL SUPPORT FOR VEHICLE TRANSPORTER

[75] Inventors: Jean-Luc Andre, Dangolsheim; Christian Fity, Illkirch Graffenstaden, both of France

[73] Assignee: Lohr, S.A., Hangenbieten, France

[21] Appl. No.: 122,248

[22] Filed: Nov. 18, 1987

[30] Foreign Application Priority Data

Nov. 18, 1986 [FR] France ................................ 8616126

[51] Int. Cl.⁴ .......................... B60P 3/07; B60T 3/00; A47F 7/04
[52] U.S. Cl. ......................................... 410/9; 410/30; 211/87
[58] Field of Search .......................... 410/4, 9, 7, 8, 19, 410/30, 47, 49; 188/32; 211/94, 87, 175, 23

[56] References Cited

U.S. PATENT DOCUMENTS

| 325,196 | 8/1885 | Caldwell | 211/87 |
| 4,496,271 | 1/1985 | Spinosa et al. | 410/8 X |
| 4,668,140 | 5/1987 | Blunden | 410/30 X |
| 4,679,974 | 7/1987 | Blunden | 410/30 |

FOREIGN PATENT DOCUMENTS

| 0624597 | 7/1961 | Canada | 211/87 |
| 0023090 | 10/1896 | United Kingdom | 211/87 |
| 0184969 | 6/1986 | European Pat. Off. | |
| 2061548 | 7/1971 | Fed. Rep. of Germany | 211/87 |
| 2902807 | 9/1979 | Fed. Rep. of Germany | 410/30 |
| 0076645 | 4/1950 | Norway | 211/87 |

Primary Examiner—Andres Kashnikow
Assistant Examiner—Richard Potosnak
Attorney, Agent, or Firm—Schwartz & Weinrieb

[57] ABSTRACT

A wheel support system according to this invention comprises an elongated generally horizontal support beam having an upwardly directed upper surface, a horizontally inwardly directed front surface, and a horizontally outwardly directed rear surface and a pair of identical arm units unconnected with and wholly independent from each other. Each arm unit includes a horizontal arm disposed generally perpendicular to the beam and having an outer end formed as an abutment directly engaging the front surface of the beam and an upwardly directed flank adapted to tangentially engage a tire surface of a wheel to be supported and a hook having a lower end connected to the arm at the abutment and an upper end, a depending part engaging the rear surface of the support beam, and an upper part operatively engaging the upper surface of the support beam. The hook and arm of each arm unit are relatively fixed and nondisplaceable. The identical arm units are angularly oriented 90° out of phase with respect to each other so as to in effect be mirror images of each other.

20 Claims, 4 Drawing Sheets

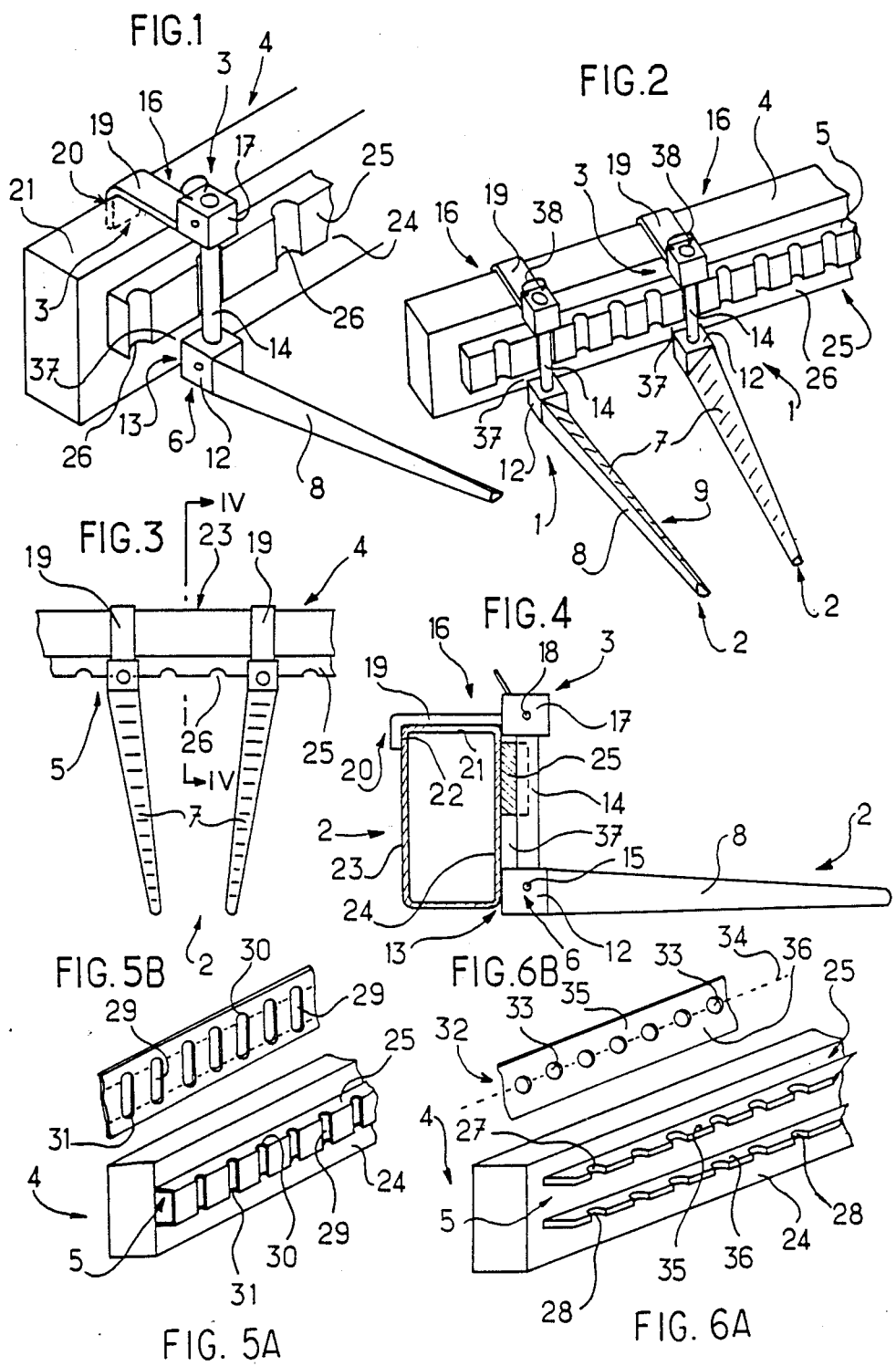

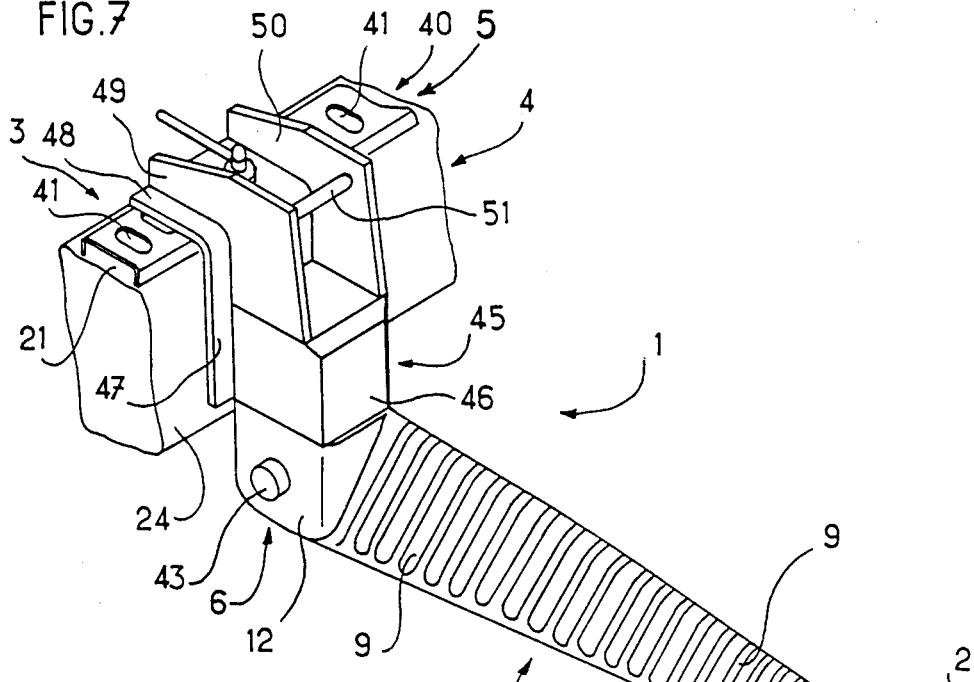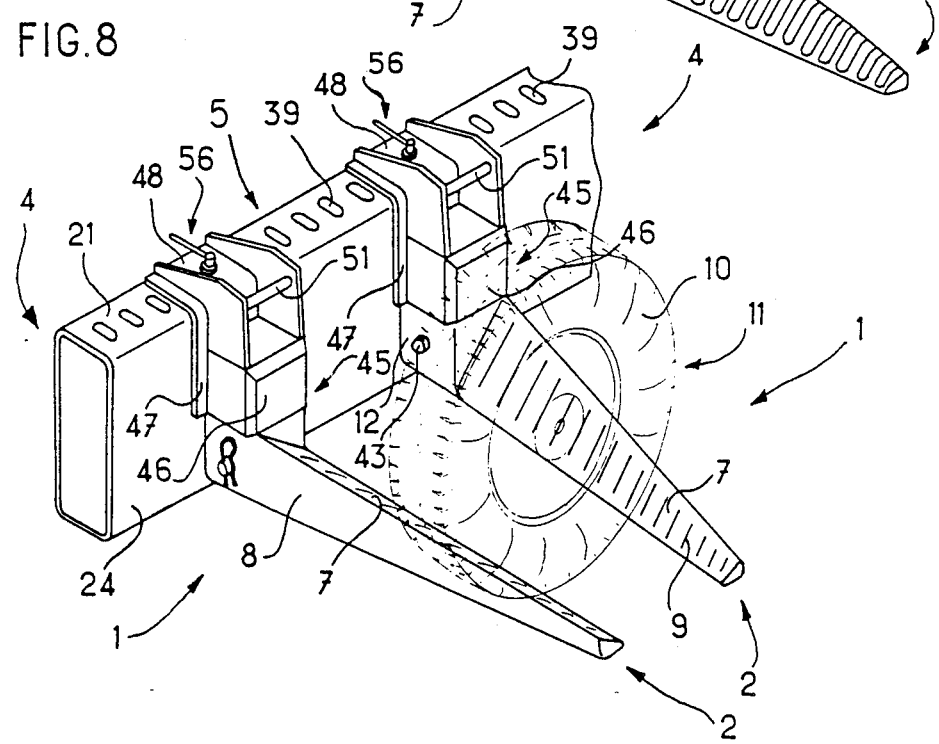

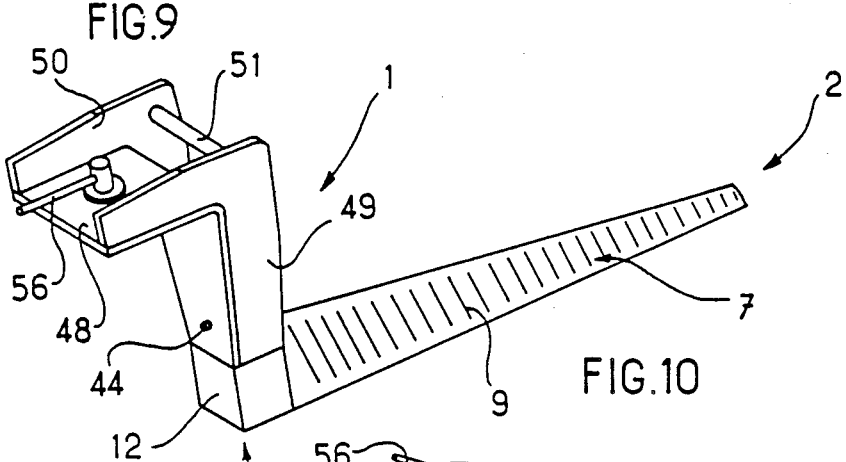
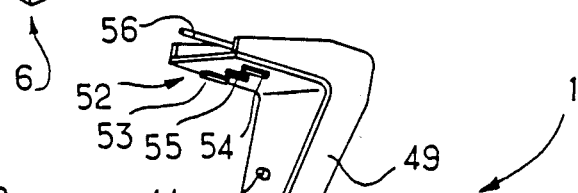
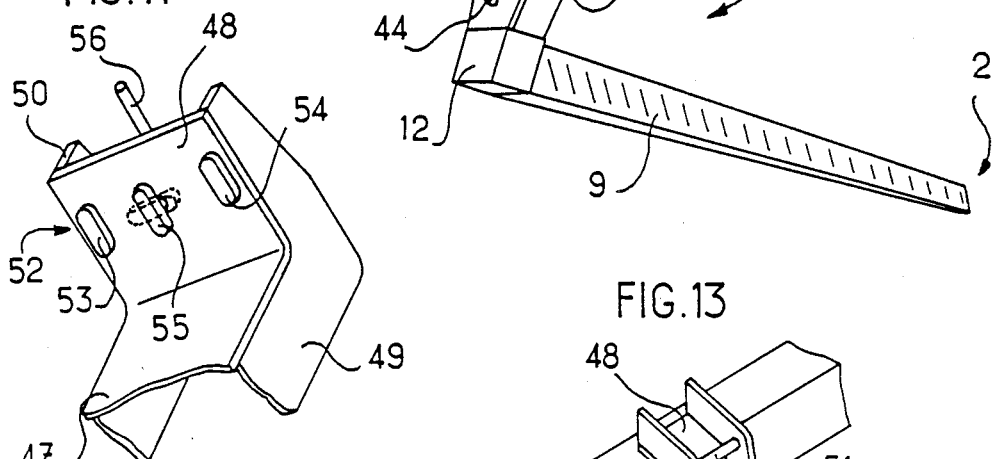
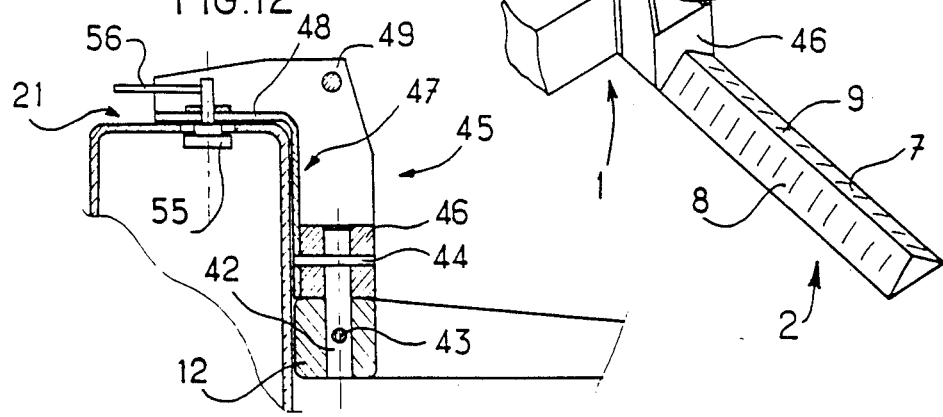
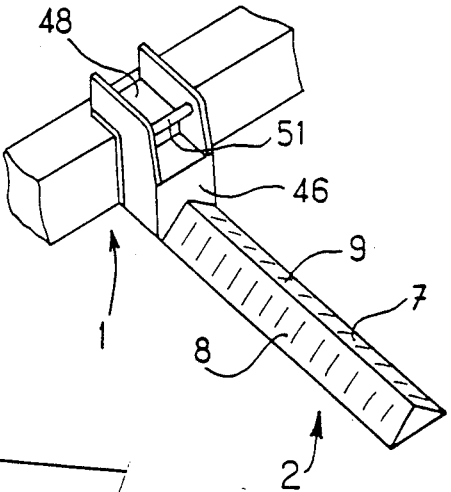

WHEEL SUPPORT FOR VEHICLE TRANSPORTER

FIELD OF THE INVENTION

The present invention relates to a wheel support system for a vehicle transporter. More particularly this invention concerns an arm normally used with another identical arm to support a wheel of a vehicle in a car transporter, for instance a car-delivery truck or railroad car.

BACKGROUND OF THE INVENTION

In our earlier U.S. Pat. No. 4,682,922 we disclose a wheel support system comprised of a pair of normally horizontal arms that in use are both perpendicular to a horizontal support beam and horizontally parallel to each other. A wheel of a vehicle whose other wheels are similarly supported is embraced between this pair of arms below its horizontal centerpoint with the wheel surface in tangential engagement with the respective two arms. The arms are movable as pairs along the beam and can be fixed at any one of a multiplicity of longitudinally defined positions therealong so as to accommodate vehicles of different wheelbases. Such pairs of arms are normally used in a vehicle-transporting truck or railroad car onto which a group of vehicles of differing wheelbases are carried. The beams of such a transporter extend sufficiently horizontally so as to prevent the vehicles from falling out of the seats formed by means of the pairs of arms, and in fact the beams are often disposed in an inclined mode as defined by means of a small acute angle with respect to the horizontal.

In the above-cited patent the arms of each pair are pivotally mounted upon a frame having as inverted J-section that itself slides along the support beam. The arms can be pivoted into a horizontal position parallel to the beam so they can be swung out of the way as another vehicle moves past them during loading or unloading or as the device is slid into position. The longitudinal spacing between adjacent arms is therefore fixed by the effective length of the frame, although it is possible to vary this frame length within certain limits. The top beam surface can be provided with indexing formations, for instance a rack-like row of teeth, within which the frame is engaged so as to prevent the frame from sliding longitudinally once the same is hooked in place.

Each arm of this device is carried upon the lower end of an upright shaft journaled within the frame and provided at its upper end with a hook plate that engages over the top surface of the beam and behind the rear surface thereof, that is, the surface opposite the front surface that is disposed toward the vehicle being supported. Thus not only does the downward force exerted by means of the vehicle upon the holder ensure that it will be hooked in place, but the force trying to rotate the shafts outwardly away from each other will pivot these hook plates and cause then to engage the beam solidly because the inner vertical edge of the outer pendant leg of each hook plate engaging the rail will also secure it longitudinally in place.

Such an arrangement, while being a substantial advance over other similar devices, nevertheless requires additional improvement. Movement of the large assembly comprised of two arms and the frame is fairly difficult for one person to achieve, especially once it has been wedged in place. Furthermore adjusting the arm spacing is difficult and must be undertaken for each individual unit. When not in use these devices also rattle and thereby create an annoyance for the driver. Making the various mechanical adjustments needed for each different vehicle and/or wheel size is also a considerably onerous task.

OBJECTS OF THE INVENTION

It is therefore an object of the present invention to provide an improved arm assembly for a wheel-holding unit of a vehicle transporter.

Another object is the provision of such an arm assembly for a wheel-holding unit of a vehicle transporter which overcomes the above-noted disadvantages, that is, which is easy for one person to set and manipulate, and which can accurately be set for virtually any vehicle wheelbase or wheel size.

SUMMARY OF THE INVENTION

A wheel holder according to this invention has an elongated generally horizontal support beam having an inwardly directed upper surface, a horizontally inwardly directed front surface, and a horizontally outwardly directed rear surface and a pair of identical arm units which are unconnected with and wholly independent with respect to each other. Each arm unit includes a horizontal arm disposed generally perpendicular to the beam and having an outer end formed as an abutment directly outwardly engaging the front surface of the support beam and an upwardly directed flank adapted to tangentially engage a tire surface of a wheel to be supported by means of the arms, and a hook having a lower end connected to the arm at the abutment portion thereof and an upper end, a depending part having an inner surface thereof disposed in engagement with the rear surface of the support beam, and an upper part operatively engaging the upper surface of the support beam. The hook and arm of each arm unit are relatively fixed and nondisplaceable.

This structure has the following advantages:

Complete interdependence of the two arm units;

Sufficient lightness such that each arm unit can easily be manipulated by means of one person;

Immediate mounting at any desired location upon the beam;

Ability to lock the device safely in place;

One-piece construction so that each arm unit can be removed easily without requiring disassembly;

Fast and simple to install and remove;

Extremely efficient locking means;

Reduced number of parts to adjust; and

Any desired spacing between arms is possible.

According to this invention the beam has a rear surface parallel to but facing oppositely from the front surface. This rear surface forms the rear portion engaging the depending part of the hooks. Thus the hook engages completely behind or outwardly about the beam.

The hook of this invention can be formed by means of a shaft having upper and lower ends, a lower mounting block disposed upon the lower end of the shaft and forming the abutment with the arm projecting horizontally inwardly from the lower mounting block, an upper mounting block disposed upon the upper end of the shaft, a plate extending outwardly from the upper block lying atop the upper surface of the support beam and having an outer end, and a bent-down outer arm disposed upon the outer end of the plate and forming depending part. Such a hook can be made very strong and at low cost. The lower block can have a planar outer face flatly engaging the fron surface of the beam for excellent force transmission.

The holder of this invention can also have an indexing formation upon the front surface of the support beam including a longitudinal row of inwardly open position-defining seats in which the hooks are engageable. The spacing between adjacent seats within the row determines the adjustability of the holders and can be set so as to allow for any normal wheel diameter.

In a particular arrangement the indexing formation comprises a squared U-shaped channel which is concave and open toward the front surface of the support beam. This channel has a bight formed with a succession of vertical slots and a pair of flanges formed with rounded inwardly open notches constituting ends of the slots and forming therewith the seats. Such a channel is formed by punching a series of transversely elongated slots within a flat plate and then bending it along two lines somewhat inward of the ends of the slots. It could also, according to another feature of this invention be formed by means a pair of vertically spaced strips extending horizontally and secured edgewise on the front surface of the support beam. These strips are formed with respective rows of inwardly open notches in vertical alignment with respect to each other for constituting the seats. Such strips could be formed by punching or drilling a succession of circular holes within a plate and then cutting the plate in half along the centerline of the row of holes.

According to a further feature of this invention the upper surface of the beam is formed with a row of through holes with depending parts or lugs projecting downward into these holes from the undersurface portion of the upper block plate.

It is also possible according to this invention for the hook to be an L-shaped stirrup having a flat bight portion engaging the front surface of the support beam and forming the abutment and another flat bight portion lying upon the upper surface of the support beam and provided with at least one fixed lug constituting the depending part and one pivotal lug also engageable through the holes. The pivotal lug can only pass through the respective hole when disposed at at least one angular position and can when pivoted from this position lock the respective arm unit upon the beam. Normally the holes are somewhat elongated and complementary to the lugs.

In another arrangement according to the invention the hook, depending part, and arm are formed unitarily of sheet metal and the beam is provided upon its upper surface with a holding strip forming a rear edge engagement portion. In this case the holder has means pivotal upon the hook for clamping the respective arm unit upon the beam at any one of a multiplicity of positions longitudinally defined therealong. This means can be some kind of eccentric engageable with a rail forming the rear edge engagement portion.

Finally according to this invention it is possible for the arm units to be movable along the beam while engaging and supporting a vehicle wheel. This allows for adjustment to position the vehicles very accurately if desired.

DESCRIPTION OF THE DRAWINGS

The above and other objects, features, and advantages will become more apparent from the following, it being understood that any feature described with reference to one embodiment of the invention can be used where possible with any other embodiment and that reference numerals not specifically mentioned with reference to one figure but identical to those of another refer to structure that is functionally if not structurally identical. In the accompanying drawings:

FIG. 1 is a small-scale perspective view of an arm assembly according to this invention;

FIG. 2 is a view like FIG. 1 but showing both arms of the assembly;

FIG. 3 is a top view of the structure of FIG. 2;

FIG. 4 is a section taken along line IV—IV of FIG. 3;

FIGS. 5A and 6A are perspective views of beams according to this invention with two different types of racks;

FIGS. 5B and 6B are perspective views of blanks from which the racks of respective FIGS. 5A and 6A are made;

FIG. 7 is an enlarged-scale perspective view of a second embodiment of the arm assembly according to this invention;

FIG. 8 is a view like FIG. 7 but showing both arms of the assembly of FIG. 7;

FIG. 9 is a perspective view taken from above and behind of the arm of the assembly of FIG. 7;

FIG. 10 is a perspective view taken from below and behind the arm of the assembly of FIG. 7;

FIG. 11 is a further perspective view from below and behind the hook end of the arm of FIG. 7;

FIG. 12 is a cross section through the beam at the center of one of the arms of the system of FIG. 7;

FIG. 13 is a small-scale perspective view taken from above and in front of a variant of the arm of FIG. 7;

SPECIFIC DESCRIPTION

Figure 14:
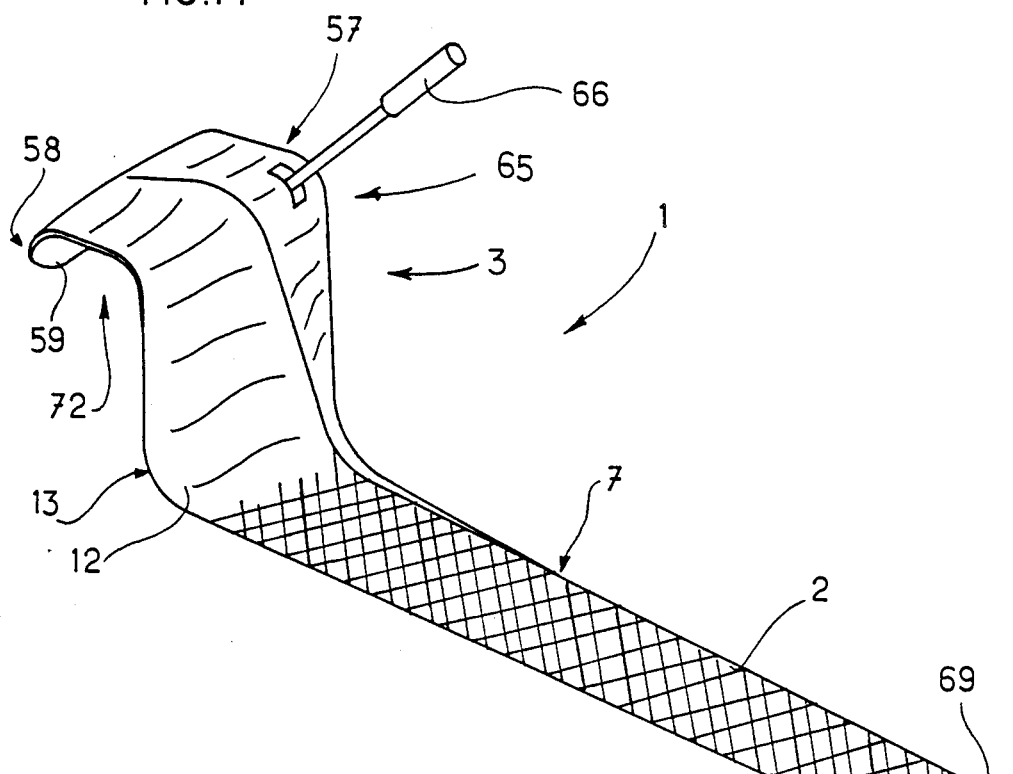
FIG. 14 is a perspective view from above and in front of a third arm according to this invention.

As seen in FIGS. 1 through 6 the wheel support according to this invention basically comprises an elongated and normally generally horizontal beam 4 and a pair of substantially identical arm units 1. The beam 4 is a hollow box beam having a generally horizontal upper wall 21 and back and front vertical sides 23 and 24. It typically forms part of a rail-like framework installed upon a vehicle transporter otherwise either constituted as a semitrailer or as a railroad car. Such a transporter carries a plurality of vehicles upon at least two superposed levels and it is desired as with all freight to pack the vehicles as compactly as possible. For this reason the arm units 1 are slidable along the beam 4. An indexing formation 5 is provided so as to define a multiplicity of longitudinally arranged positions in which the arm units 1 can be locked against longitudinal displacement upon the beam 4.

Each arm unit 1 comprises a hook assembly 3, a beam abutment 6, and a wheel-support arm 2. The arms 2 are each formed as a solid metal bar of generally right-triangular section and formed upon its inner end with a solid square-section mounting block 12 forming the respective abutment 6. Each arm 2 tapers toward its outer end and has an inclined flank 7 forming the hypotenuse of its right-triangular section and an upright flank 8, the former flank 7 being formed with grooves or striations 9 disposed transverse to the arm 2. Each assembly according to this invention has two such arm units 1 and the only difference between them is that the arms 2 have their inclined flanks 7 disposed toward one another, that is they are identical but mirror images of each other as a result of being disposed in orientations which are 90° out of phase with respect to each other, and in addition they are set so that their adjacent edges are generally parallel and perpendicular to the beam 4 as shown in FIG. 2 in spite of their inwardly tapering shape. In use as shown only in FIG. 8 a tire 10 of a wheel 11 is interposed between the two arms 2 of a respective assembly according to this invention with the tire 10 tangentially engaging the striated inclined faces 7 of the respective arms 2.

Each hook assembly 3 comprises a vertical cylindrical shaft 14, an upper mounting block 17 and a hook plate 16. The shaft 14 has a lower end secured by means of a pin 15 within the mounting block 12 and an upper end fixed by means of a pin 18 within the upper block 17. The hook 16 is L-shaped in configuration and has a long upper arm 19 with an inner end fixed in the rear face of the block 17 and a shorter outer arm 20 that projects downwardly. Thus the arm 19 lies atop the top face 21 of the beam 4 and the arm 20 engages the rear face 23 with its inner face 22. The block 12 forming the abutment 6 has a rear face 13 that flatly engages the front side 24 of the support beam 4, so that the device is securely supported upon the beam 4. In addition the vertical length of the pendant arm 20 of the hook 16 is shorter than the vertical space 37 between the top of the abutment block 12 and the bottom of the indexing formation 5 so that the entire unit 1 can be lifted or removed relatively easily from the beam 4. A handle 38 is provided upon each upper block 17 so as to allow the unit 1 to be lifted easily. If necessary a spring-loaded catch can be provided so as to hold the units 1 in place when they are not supporting a wheel so that they do not become disengaged from the beam 4.

The indexing formation 5 is constituted as a solid-metal rack 25 welded to the front side 24 of the beam 4 so as to lie below the upper block 17 and above the lower block 12 and formed with a longitudinally spaced succession of semicylindrical inwardly open seats 26 in which the shafts 14 are accommodated in a complementary manner. The longitudinal spacing of these seats 26 is close enough to accommodate virtually any size of vehicle—car or truck—in the transporter equipped with the wheel support of the instant invention.

Whatever the shape of the indexing formation 5, it serves mainly to establish a fixed location for the arm units 1 and does not actually arrest them longitudinally. In use the weight of the vheicle is effective upon the arms 2 so as to cause the hook assemblies 3 to grasp the beam 4 tightly, and the horizontal component of the vehicle's weight as transmitted to the arms 2, is effective to push the two arm units 1 of each assembly apart and thereby effectively lock the hooks 3 upon the beam 4 as described above in our earlier patent. For this reason, each seat 26 of the indexing formation 5 need not be very large or pronounced and can be formed, if necessary by corrugated or grooved sheet metal or any other profile piece available commercially.

As shown in FIGS. 5A and 5B the formation 5 can be formed by means of a U-section shaped sheet-metal rack 25 which is itself cut from a blank shown in FIG. 5B formed with a succession of slots 29 with rounded ends 30 bent at lines 31 so that the ends 30 of the slots 29 form semicircular seats for the shafts 14. In FIGS. 6A and 6B the formation 5 is formed by means of a pair of racks 25 which are formed by cutting a blank 32 shown in FIG. 6B with circular perforations along line 34 into two identical pieces 35 and 36 that are then welded in a manner similar to that of U-shaped rack 25 of FIG. 5A to the front side 24 of the beam 4 so as to form aligned semicircular seats 27 and 28.

In the arrangement of FIGS. 7 through 12 the same reference numerals as in FIGS. 1 through 4 are used, for functionally identical structure. Here the wheel holder comprises, as also seen in FIGS. 1 through 4, an elongated and normally generally horizontal beam 4 and a pair of substantially identical arm units 1. An indexing formation 5 is provided and each arm unit 1 comprises a hook assembly 3, a beam abutment 6, and wheel-support arm 2. The arms 2 are each formed as in FIGS. 1 through 4, with a mounting block 12 forming the respective abutment 6 and each arm 2 has an inclined flank 7 and an upright flank 8, the former flank 7 being formed with grooves or striations 9. Once again the only difference between the two units 1 of the assembly that the arms 2a are identical yet disposed in a 90° out-of-phase angular orientation with respect to each other so as to define mirror images of each other.

Each hook assembly 3 comprises a U-shaped stirrup 45 provided at its lower end with a mounting block 46 within which a vertical rod 42 is secured by means of a pin 44 as best seen in FIG. 12. The depending lower end of this rod 42 is seated within the mounting block 12 of the arm 2 and is secured therein by means of a removable pin 43. The stirrup 45 has two mutually perpendicular bight plates 47 and 48 which in use respectively lie upon the faces 24 and 21 of the beam 4 and two parallel L-shaped side plates 49 and 50 secured together at their outer corner by means of a handle/reinforcement rod 51. The bight plate 48 is formed with hook formations 52 comprised of two lozenge-shaped depending lugs 53 and 54 flanking a central lozenge-shaped lug 55 that is carried upon a rod so as to project beyond the plate 48 by means of a distance greater than the thickness of the top wall 21 of the beam 4 as shown in FIG. 12. A handle 56 can rotate this lug 55.

The indexing formation 5 is constituted as a series of lozenge-shaped or oblong slots or holes 39 spaced longitudinally along the top wall 21 of the beam 4 which can be reinforced as shown in FIG. 7 by means of a top-wall reinforcing plate 40 formed with identical apertures 41. The longitudinal spacing of the holes 39 is identical to that of the lugs 53, 54, and 55 and these holes 39 are complementarily shaped to these formations 52. Thus the hook unit 3 can be set atop the beam 4 with the lugs 53, 54, and 55 fitting into the holes 39. The middle lug 55 will pass all the way through its hole 39 so that a turn of the handle 56 can lock it in place inside the beam 4, thereby effectively securing the unit 1 to the beam 4 at the desired position. Even without the lug 55 engaged, the unit 1 will hang by itself upon the beam 4 and is even capable of supporting its maximum load.

FIG. 13 shows an arm unit 1 identical to the unit 1 of FIGS. 7 through 12, but with an arm 2 of equilateral-triangular section, that is having a pair of identically inclined flanks 7 and 8 both formed with holding grooves 9. Such an arm unit 1 can be used either in front of or behind the tire it is supporting.

Figure 15:
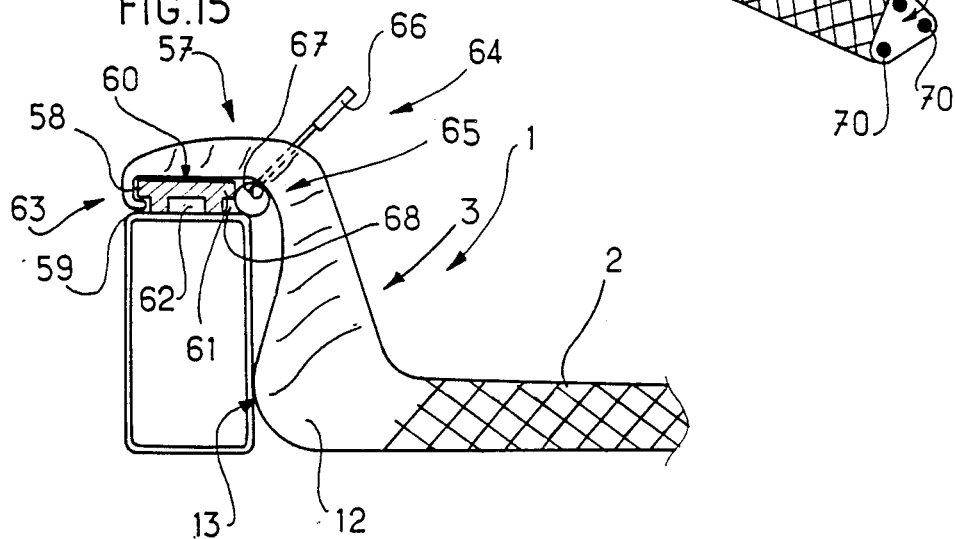
FIG. 15 is a longitudinal section through the arm of FIG. 14 and a cross section through the beam it is mounted upon.

In the arrangement of FIGS. 14 and 15 the arm unit 1 has an arm 2 integral with its hook 3. The arm 2c is formed by a channel 7 of inverted V-section as seen in FIG. 13 and having a solid cast core 69 reinforced by means of rods 70. The hook part 3 is comprised of a plate 57 of inverted J-shape formed integrally and unitarily with the channel 7 and itself forming the mounting part 12 and the abutment 13 that engages the front face of the beam 4. The upper end of this plate 57 has a bent-down rear arm 58 terminating in a bent-back lip 59 projecting horizontally and parallel to the arm 2.

Here the beam 4 carries upon its upper surface a rail 60 forming a seat 63 receiving the lip 59. To this end the rail 60 is generally of pi-section, with a base hollowed out at 62 and two projecting flanges 61, the former forming a groove constituting the seat 63 and the latter projecting inward. The hook plate 57 is provided with a locking mechanism 65 comprised of a lever 66 carrying a locking element 68 mounted upon an eccentric pin 67 so that it can be moved by pivoting the lever clockwise as seen in FIG. 15 to a position under the front flange 61. Thus this device can be hooked by means of the lip 58 upon the beam 4, suspended so that its abutment 13 makes contact with the front surface of the beam 4, and then locked in place by movement of the lever 66. There is no indexing formation here so that the arm unit 2 can be disposed at any position along the beam 4.

Obviously, many modifications and variations of the present invention are possible in light of the above teachings. It is therefore to be understood that within the scope of the appended claims, the present invention may be practiced otherwise than as specifically described herein.

We claim:

1. A wheel support system for a vehicle, comprising:
a pair of identical arm means separate and distinct, and wholly independent with respect to each other, for engaging forward and rear surfaces of a vehicle wheel;
a longitudinally extending support beam;
bracket means operatively connected to each one of said pair of identical arms means for supporting said each one of said pair of identical arm means upon said longitudinally extending support beams; and
indexing means defined along said longitudinally extending support beam for cooperating with said bracket means of said each one of said pair of identical arm means so as to permit positional adjustment of said each one of said pair of arm means along said longitudinally extending support beam;
said each one of said pair of identical arm means including a wheel support arm extending substantially perpendicular to said longitudinally extending support beam when said each one of said pair of identical arm means is disposed in its wheel support mode, and having a substantially triangular cross-sectional configuration such that one surface of said wheel support arm tangentially engages one of said forward and rear surfaces of said vehicle wheel; and a substantially cube-shaped mounting block integral with said wheel support arm for mounting said wheel support arm upon said bracket means in such a manner that said pair of identical arm means are disposed 90° out-of-phase with respect to each other so as to define mirror images of each other when disposed in said wheel support mode engaging said forward and rear surfaces of said vehicle wheel.

2. A wheel support system as set forth in claim 1 wherein:
said triangular cross-sectionally configured support arms having a cross-sectional configuration which is that of a right-triangle.

3. A wheel support system as set forth in claim 2 wherein:
said one surface of each of said support arms tangentially engaging one of said surfaces of said vehicle wheel is defined by means of the hypotenuse of said right-triangular configuration of said each one of said support arms.

4. A wheel support system as set forth in claim 1, wherein:
said support beam comprises a box-beam having a substantially rectangular configuration in cross-section.

5. A wheel support system as set forth in claim 1 further comprising:
plate means fixedly secured to an upper surface of said support beam;
means defining a longitudinal array of holes within said plate means for serving as said indexing means; and
depending means projecting downwardly from said bracket means into said hole means so as to permit said positional adjustment of said bracket means and said pair of identical arm means along said support beam.

6. A wheel support system as set forth in claim 5 wherein:
said depending means of said bracket means comprises at least one dependent lug fixedly mounted upon said bracket means for engagement with said hole means of said plate means; and at least one dependent lug pivotably mounted upon said bracket means between a first position at which said pivotable lug can be inserted into said hole means for engaging said bracket means with said plate means, and a second position at which said pivotable lug cannot be removed from said hole means of said plate means whereby said bracket means is lockingly secured upon said plate means of said support beam.

7. The wheel support system as defined in claim 1, wherein:
said bracket meams has a substantially inverted J-shaped cross-sectional configuration including a downwardly dependent component thereof; and
said support beam has a rear surface parallel to but facing oppositely from a front surface thereof, said rear surface including a rear edge portion engaging said dependent component of said bracket means.

8. The wheel support system as in claim 7, wherein said bracket means comprises:
a shaft having upper and lower ends;
said cube-shaped mounting block being disposed upon said lower end of said shaft and engaging said front surface of said support beam, said wheel support arm projecting horizontally from said cube-shaped mounting block;
an upper mounting block disposed upon said upper end of said shaft;
a plate fixedly connected to said upper mounting block so as to be disposed atop an upper surface of said support beam; and
said dependent component is integrally fixed to said plate.

9. The wheel support system as defined in claim 1, wherein:

said indexing means is defined upon a front surface of said support beam and includes a longitudinal row of inwardly open, position-defining seats, said bracket means being engageable within said seats.

10. The wheel support system as defined in claim 9, wherein:
said indexing means comprises a substantially U-shaped concave channel open toward said front surface of said support beam and having a bight formed with a succession of vertically extending slots, and a pair of flanges formed with rounded inwardly open notches constituting ends of said slots and forming therewith said seats for said bracket means.

11. The wheel support system as defined in claim 9, wherein:
said indexing means comprises a pair of vertically spaced, horizontally extending strips secured edgewise upon said front surface of said support beam and being formed with respective rows of inwardly open notches in vertical alignment with respect to each other so as to constitute said seats for said bracket means.

12. The wheel support system as defined in claim 1, wherein:
an upper surface of said support beam is formed with a row of through-holes constituting said indexing means; and
depending means projecting downwardly from said bracket means into said holes so as to permit said positional adjustment of said bracket means and said pair of identical arm means along said support beam.

13. The wheel support system as defined in claim 12, wherein:
said bracket means comprises an L-shaped stirrup having a first flat bight portion engaging a front surface portion of said support beam and a second flat bight portion lying upon said upper surface of said support beam and provided with said depending means which includes at least one fixed lug and one pivotal lug engageable within said holes of said support beam.

14. The wheel support system as defined in claim 13, wherein:
said pivotal lug can only pass through its respective hole of said support beam when said pivotal lug is disposed at a first predetermined angular position, and when pivoted from said first position to a second predetermined angular position, said pivotal lug locks its respective arm means upon said support beam.

15. A wheel support system as set forth in claim 1 wherein:
said one surface of said wheel support arm includes transversely oriented grooves therein for enhancing traction engagement between said wheel support arm and said vehicle wheel.

16. A wheel support system for a vehicle, comprising:
a pair of identical arm means separate and distinct, and wholly independent with respect to each other, for engaging forward and rear surfaces of a vehicle wheel;
a longitudinally extending support beam;
rail means fixedly mounted upon said longitudinally extending support beam and having first and second flange means defined thereon;
bracket means operatively connected to each one of said pair of identical arm means for supporting said each one of said pair of identical arm means upon said longitudinally extending support beam, said bracket means having a hooked portion for engaging said first one of said flange means of said rail means so as to suspendingly support said bracket means upon said rail means of said support beam; and
means pivotably mounted upon said bracket means for movement between a first position at which said pivotably mounted means lockingly engages said second one of said flange means of said rail means so as to secure said bracket means and said arm means upon said support beam, and a second position at which said pivotably mounted means disengages said second one of said flange means of said rail means so as to permit said bracket means and said arm means to be removed from said support beam.

17. A wheel support system as set forth in claim 16, wherein said means pivotably mounted upon said bracket means comprises:
a locking element eccentrically mounted upon said bracket means; and
lever means pivotably mounted upon said bracket means and fixedly connected to said locking element for moving said locking element between said first and second positions.

18. A wheel support system as set forth in claim 16, wherein:
said bracket means and said arm means are integrally formed as a single structure.

19. A wheel support system as set forth in claim 16, wherein:
said arm means have a substantially triangular cross-sectional configuration.

20. A wheel support system as set forth in claim 19, wherein:
each of said arm means has a surface which tangentially engages a surface of said vehicle wheel; and
said surface of said arm means which engages said vehicle wheel includes transversely oriented grooves therein for enhancing traction engagement between said arm means and said vehicle wheel.

* * * * *